United States Patent
Almeida et al.

(10) Patent No.: US 8,957,963 B2
(45) Date of Patent: Feb. 17, 2015

(54) METHOD FOR CALIBRATING A CAMERA-BASED SYSTEM

(75) Inventors: Carlos Almeida, Lindau (DE); Christian Schaale, Weißensberg (DE); Thomas Fechner, Kressborn (DE)

(73) Assignee: ADC Automotive Distance Control Systems GmbH (DE)

( * ) Notice: Subject to any disclaimer, the term of this patent is extended or adjusted under 35 U.S.C. 154(b) by 855 days.

(21) Appl. No.: 13/146,685

(22) PCT Filed: Jan. 28, 2010

(86) PCT No.: PCT/DE2010/000084
§ 371 (c)(1),
(2), (4) Date: Oct. 11, 2011

(87) PCT Pub. No.: WO2010/088876
PCT Pub. Date: Aug. 12, 2010

(65) Prior Publication Data
US 2012/0019652 A1   Jan. 26, 2012

(30) Foreign Application Priority Data
Feb. 6, 2009  (DE) .................. 10 2009 007 840

(51) Int. Cl.
*H04N 7/00* (2011.01)
*H04N 9/47* (2006.01)
*H04N 17/00* (2006.01)

(52) U.S. Cl.
CPC ........ *H04N 17/002* (2013.01); *B60R 2300/108* (2013.01)
USPC ........................................................ 348/135

(58) Field of Classification Search
CPC ........ B60R 1/00; B60R 2300/108; B60J 3/00; B60J 3/04
USPC .................................................... 348/135, 148
See application file for complete search history.

(56) References Cited

U.S. PATENT DOCUMENTS

| | | | |
|---|---|---|---|
| 4,925,310 A * | 5/1990 | Feppon et al. ................ 356/434 |
| 6,097,023 A | 8/2000 | Schofield et al. | |
| 2005/0275562 A1* | 12/2005 | Watanabe ..................... 340/933 |
| 2006/0125919 A1 | 6/2006 | Camilleri et al. | |
| 2008/0219505 A1* | 9/2008 | Morimitsu ..................... 382/103 |
| 2009/0043458 A1* | 2/2009 | Kamioka et al. ................ 701/49 |
| 2009/0122297 A1* | 5/2009 | Ikeno et al. ................... 356/5.09 |

FOREIGN PATENT DOCUMENTS

| DE | 102006056180 | * | 4/2006 |
|---|---|---|---|
| DE | 102005050795 A1 | | 4/2007 |

(Continued)

OTHER PUBLICATIONS

German Search Report mailed Dec. 18, 2009, in related Application No. DE 10 2009 007 840.1.

(Continued)

*Primary Examiner* — Andy Rao
*Assistant Examiner* — Jared Walker
(74) *Attorney, Agent, or Firm* — RatnerPrestia

(57) ABSTRACT

Disclosed herein is a method for calibrating a camera-based system of a vehicle (F), having a pane (S), in particular of a camera-based driver assistance system. A type of the pane (S), in particular the tinting thereof, is detected by way of the camera-based system.

13 Claims, 1 Drawing Sheet

(56) References Cited

FOREIGN PATENT DOCUMENTS

| | | |
|---|---|---|
| DE | 102006044428 A1 | 4/2008 |
| DE | 102006056180 A1 | 4/2008 |
| EP | 2053868 A1 | 4/2009 |
| GB | 2201782 | 9/1988 |
| WO | 0177763 A1 | 10/2001 |

OTHER PUBLICATIONS

International Search Report issued in PCT/DE2010/000084 filed Jan. 28, 2010, mailed Apr. 19, 2010.

* cited by examiner

METHOD FOR CALIBRATING A CAMERA-BASED SYSTEM

CROSS REFERENCE TO RELATED APPLICATIONS

This application is the U.S. National Phase Application of PCT International Application No. PCT/DE2010/000084, filed Jan. 28, 2010, which claims priority to German Patent Application No. 10 2009 007 840.1, filed Feb. 6, 2009, the contents of such applications being incorporated by reference herein.

FIELD OF THE INVENTION

The invention relates to a method for calibrating a camera-based system of a vehicle, comprising a pane, in particular of a camera-based driver assistance system.

BACKGROUND OF THE INVENTION

Usually, such camera-based systems are calibrated at the end of a production line during the vehicle manufacture by means of special test objects, wherein both an alignment of an area to be detected as well as an optimal color detection and a white balance are adjusted. In particular with such systems, which have a camera arranged in an interior of the vehicle and an imaging performed through a pane of the vehicle, when exchanging the pane, unless it is not replaced by a pane of the same type, a renewed calibration must be performed to avoid quality losses, since different pane types very strongly differ in their transmission properties. For this purpose, for the various types of the panes corresponding sets of parameter to be selected are stored in the system or the system is individually adapted to the new pane. This new calibration must be performed in a specialist garage.

From DE 10 2006 056 180 A1, which is incorporated by reference, a method and an apparatus for calibrating an image sensor in a vehicle is known. The calibration is made here depending on the properties of a vehicle pane. The apparatus comprises an image sensor for detecting the environment information, a computer unit, which evaluates detected environment information, as well as a selection means for selecting parameter settings of the image sensor. Within the method at least one marking on the vehicle pane is detected and evaluated by means of an image sensor. On the basis of the detected marking properties of the vehicle pane are determined. Thereby the parameters of the image sensor are set suitably for the detection of image information on the basis of the determined properties of the vehicle pane.

It is disadvantageous here that only vehicle panes can be used, which have a detectable and identifiable marking, which necessitates an additional production expenditure for the production of these vehicle panes. If vehicle panes are used, which do not have such a marking, there is no calibration, from which quality losses result in the detection of environment information. Moreover, in prior art methods it is required to first provide a vehicle pane with a marking, which contains information on the vehicle pane. It is further disadvantageous that with incorrect markings incorrect calibrations are performed.

SUMMARY OF THE INVENTION

The invention is therefore directed to an improved method for calibrating a camera-based system of a vehicle comprising a pane, in particular of a camera-based driver assistance system.

This is achieved according to aspects of the invention by a method for calibrating a camera-based system of a vehicle (F) comprising a pane (S), in particular of a camera-based driver assistance system, wherein a type of the pane (S), in particular the tinting thereof, is automatically detected by way of the camera-based system.

In accordance with the invention a type of the pane, in particular the tinting thereof, i.e. color value and tinting degree, is automatically detected by way of the camera-based system.

By means of the solution according to aspects of the invention the camera-based system can be automatically newly calibrated for example after an exchange of the pane, ensuring an optimum functionality of the system. This method functions with panes according to the prior art, i.e. special panes, provided for example with a marking, are not required in this case, whereby no additional costs arise. By the automatic calibration a complex time- and cost-intensive manual calibration, which must be performed for example in a specialized garage, is no longer required. In particular the method according to aspects of the invention enables a fault-free operation of the camera-based system even if the originally used pane was replaced by a pane of another construction type.

Expediently, values determined by way of the camera-based system, for example brightness values and/or color values are automatically compared with correspondingly stored data. For this purpose in an advantageous form of embodiment corresponding values of detected road sections are determined, since the road surfaces largely match in color.

In a further advantageous form of embodiment, values of detected external light sources are determined, in particular in the dark, wherein such a light source particularly preferably is a headlight of approaching vehicles, since the headlight is internationally standardized white to light yellow. From the determined values preferably an average value of the headlight is formed and compared with a standard value of a reference headlight stored in the camera-based system.

In a development of the invention the values of the headlight and/or the average value of the headlight are determined dependent on the image position. Thereby, the correlation of the image position with the distance and the dependency of the brightness of the headlight from the distance are considered.

For optimizing the safety of the method, in advantageous manner a predetermined image section is statistically evaluated, i.e. not an entire detected range, but only a predetermined image section. This image section is expediently predetermined in such manner that it detects for example the road surface of the road section ahead of the vehicle.

Preferably, a color camera is used for determining the brightness values and/or color values and expediently an electronic image processing is performed. In particular for reliably detecting color values and tinting values, a color camera is of advantage. Such color cameras are already used with camera-based systems, in particular with camera-based driver assistance systems. By means of the electronic image processing the determined values are evaluable.

In advantageous manner parameters of the camera-based system are automatically adapted corresponding to the detected type of the pane, wherein this adaptation of the parameters in a particularly favorable form of embodiment is performed by selecting the parameters stored for the type of the pane in the camera-based system. If for each type of the pane, which can be built into the vehicle, corresponding parameters are stored in the camera-based system, immediately after the type of the pane was detected, a corresponding set of parameters can be automatically selected, so that for example after an exchange of the pane the camera-based system is immediately automatically optimally newly calibrated and thus continues to be fully functional.

With a digital image processing and in particular with a color value detection, as it is required with panes of different color and/or with a different transmittance, a standardization of a color space to white, the so-called white balance, according to prior art is a major challenge. The method offers in a simple manner a very efficient possibility of the white balance and thus an optimal calibration of the camera-based system, since this white balance is automatically performed and is regularly practicable. The white balance of the camera-based system is performed preferably by comparing the average value of the headlight with the standard value of the reference headlight stored in the camera-based system and the parameters of the system are automatically correspondingly adapted, so that the average value of the headlight determined after the adaptation conforms to the stored standard value.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

Figure 1:
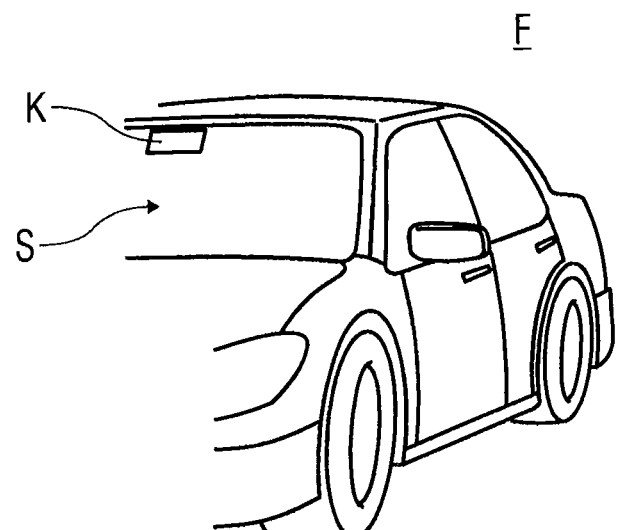
FIG. 1 shows a schematic representation of a camera-based system in a vehicle.

FIG. 1 shows a schematic representation of a camera-based system in a vehicle F. In the example of embodiment shown here a camera K, preferably a color camera, of the camera-based system is arranged in an interior of the vehicle F behind a pane S, in the example of embodiment shown here behind a front pane of the vehicle F, and is directed outwards to an area ahead of the vehicle F. The camera-based system furthermore comprises an electronic image processing not represented here in detail. For example after an exchange of the pane S, behind which the camera K is arranged, the camera-based system must be newly calibrated to continue to be fully functional, if the front pane is replaced by a pane S of another type, as panes S of various type can have different coloring, transmission and/or tinting properties.

Figure 2:
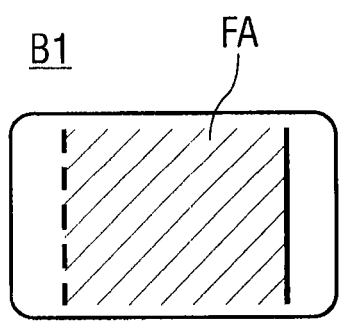
FIG. 2 shows a schematic representation of a first image section.

FIG. 2 shows a schematic representation of a first image section B1, which is statistically evaluated. The image section B1 is predetermined in such a manner that it detects a road surface of a road section FA ahead of the vehicle F. Such road surfaces comprise a grey surface largely conforming in color. If data of these road surfaces, i.e. for example color data and/or brightness data, are stored in the camera-based system, they can be compared with currently determined values. In case of a deviation the camera-based system is not optimally calibrated and must be newly calibrated to function at optimum. This is the case for example after an exchange of the pane S, behind which the camera K is arranged, if, as in the example of embodiment shown here, the front pane is replaced by a pane S of another type, since panes S of various type can have different coloring, transmission and/or tinting properties. Since current parameters of the camera-based system are known, by comparing the currently determined values with the stored values the type of the newly inserted pane S can be determined on the basis of a dimension of the deviation of the values from each other and the parameters fitting this type, which are reasonably stored in the system, are automatically selected and set, whereby the camera-based system is automatically newly calibrated. Afterwards the optimal operability is again restored. This automatic calibration does no longer require a manual time- and cost-intensive calibration for example in a specialist garage. Additional cost-intensive measures, such as for example exclusively the use of specially marked panes, are equally not required.

Figure 3:
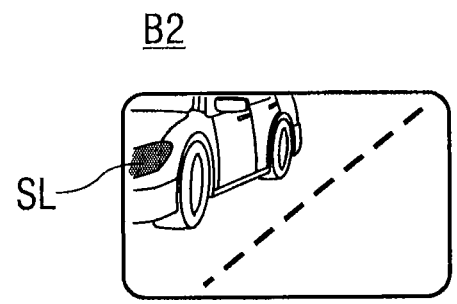
FIG. 3 shows a representation of a second image section.

FIG. 3 shows a further, alternative or additional form of embodiment of the method. Here, a second image section B2, which is statistically evaluated, is predetermined in such a manner that in the dark the headlight SL of approaching vehicles is detected. The headlight SL of vehicles is internationally standardized white to light yellow. If from the determined values of the headlight SL of several vehicles an average value is formed and is compared with a standard value of a reference headlight stored in the camera-based system, then analogous to the process described in FIG. 2 it can be determined by means of the road surface whether there is a deviation and whether therefore the camera-based system must be newly calibrated to function at optimum. If this is the case, for example after an exchange of the pane S, by comparing the currently determined values with the stored values the type of the newly inserted pane S can be determined while using the currently set parameters of the camera-based system on the basis of a dimension of the deviation of the values from each other, and the parameters fitting this type, which are reasonably stored in the system, are automatically selected and set. Afterwards the camera-based system is automatically newly calibrated so that its optimal operability is again restored.

In doing so, the values of the headlight SL and/or the average values of the headlight SL are preferably determined dependent on the image position.

The alternative or additional form of embodiment of the method shown in FIG. 3 offers as a further advantage in an efficient manner a simple, as automatically practicable, white balance of the camera-based system. Such a white balance, which is required for an optimal operability of the camera-based system, according to prior art still is a major challenge, in particular an automatic embodiment of the white balance. The white balance is practicable by comparing the average value of the headlight SL with the standard value of the reference headlight stored in the camera-based system. In case of a deviation the parameters of the camera-based system are automatically correspondingly adapted until the average value of the headlight SL determined after the adaptation conforms to the stored standard value.

REFERENCE NUMERALS

B1, B2 Image section
F Vehicle
FA Road section
K Camera
S Pane
SL Headlight

The invention claimed is:

1. A method for calibrating a camera-based system of a vehicle including a windshield pane, the method comprising:
    capturing, by the camera-based system, an image through the windshield pane;
    determining information in the captured image;
    forming an average value of the information in the captured image;

comparing the average value determined by way of the camera-based system with an average value stored in the system; and automatically detecting, by the camera-based system, a type of the windshield pane based on the comparison of the average values, and independent of a marker on the windshield pane.

2. A method according to claim 1 further comprising determining values of detected road sections (FA).

3. A method according to claim 2 further comprising determining values of detected external light sources.

4. A method according to claim 3 further comprising determining the values of the headlight (SL) and/or the average value of the headlight (SL) based upon an image position.

5. A method according to claim 3 further comprising performing a white balance of the camera-based system by comparing an average value of the headlight (SL) with a standard value of a reference headlight stored in the camera-based system.

6. A method according to claim 1 further comprising statistically evaluating a predetermined image section (B1, B2).

7. A method according to claim 1 further comprising using a color camera for determining a brightness values and/or color values.

8. A method according to claim 1 further comprising performing electronic image processing.

9. A method according to claim 1 further comprising automatically adapting parameters of the camera-based system corresponding to the detected type of the pane.

10. A method according to claim 9, wherein adaptation of the parameters is performed by selecting parameters stored for the type of the pane in the camera-based system.

11. A method according to claim 1, wherein a tinting of the pane is automatically detected by way of the camera-based system.

12. A method according to claim 1, wherein the camera-based system of the vehicle is a camera-based driver assistance system.

13. A method for calibrating a camera-based driver assistance system of a vehicle having a tinted window pane, the method comprising:

capturing, by the camera-based system, an image through the window pane;

determining information in the captured image, the information including at least one of a color value or a brightness value;

forming an average value of the information in the captured image;

comparing the average value determined by way of the camera-based system with an average value stored in the system; and the step of automatically detecting, by the camera-based system, a type of the window pane based on the comparison of the average values, and independent of a marker on the window pane.

* * * * *